May 28, 1957     R. C. MEIER, JR     2,793,877

RESILIENTLY MOUNTED SIDE WHEELS FOR BICYCLES

Filed April 19, 1954

INVENTOR.
ROBERT C. MEIER JR.

BY
Pearson + Pearson
ATTORNEYS

United States Patent Office 2,793,877
Patented May 28, 1957

2,793,877

RESILIENTLY MOUNTED SIDE WHEELS FOR BICYCLES

Robert C. Meier, Jr., Salem, N. H.

Application April 19, 1954, Serial No. 424,027

7 Claims. (Cl. 280—293)

This invention relates to stabilizing attachments for bicycles of the type having a pair of auxiliary side wheels for supporting a bicycle in upright position.

Many such devices have been proposed heretofore some being in the form of pivotable stands for supporting a riderless bicycle when not in use and some being training devices for temporary attachment while a rider learns to balance. The pivotable stand type of device when provided with wheels is usually not practical as a balance training device because the stand must be comparatively flush with the bicycle as a permenent attachment. A balance training device on the other hand requires auxiliary wheels well spaced apart to provide sufficient lateral support and is usually removed as soon as possible by the novice rider because of the projection, appearance and drag of the extra wheels.

The principal object of this invention is to provide a pair of auxiliary wheels which are easily connected to a bicycle and which both remain in contact with the ground when the bicycle tilts in either direction.

Another object of the invention is to provide a pair of resiliently mounted auxiliary wheels which constantly urge a bicycle into vertical position but permit slight leaning thereof to either side within predetermined angles before stopping further leaning.

A further object of the invention is to provide a single flat leaf spring for resiliently connecting an auxiliary wheel axle to the bicycle rear wheel axle together with a rigid bracket for limiting the travel of the spring.

Figure 1:
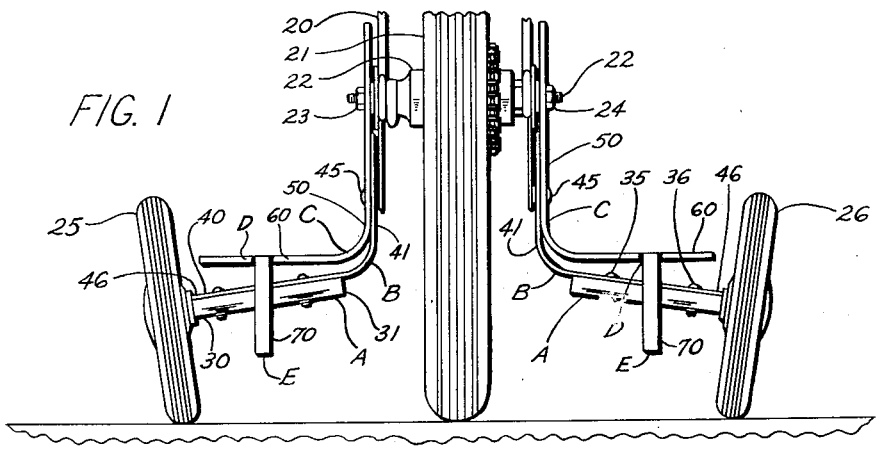
Fig. 1 is a rear elevation of the invention applied to a bicycle.

In Fig. 1 the invention is shown applied to a conventional two wheel bicycle having the usual frame 20, rear wheel and tire 21, rear axle 22 and rear axle nuts 23 and 24. A pair of auxiliary side wheels 25 and 26 are provided, each of considerably less diameter than the diameter of the rear wheel 21.

The stabilizing attachment of this invention includes stub axles A, flat springs B, rigid brackets C and preferably means D and means E forming part of the brackets C for limiting the travel of the springs B and axles A.

Each stub axle A includes an outer extremity or end portion 30 upon which an auxiliary side wheel such as 25 is rotatably mounted and extends inward along the axis of rotation of the wheel for a considerable distance. At least the inner end portion 31 of each stub axle A and preferably nearly the entire length of the axle is carried by a flat spring B.

Each flat spring B is of flat resilient metal and includes an outer portion 40 which is partially coextensive with a stub axle A. The outer portion 40 of each spring B is flatwise against and fixed to the stub axle A by means of bolts such as 35 and 36 or any convenient means such as welding and preferably overlies the stub axle A. The outer terminus 46 of each spring B is proximate but not in engagement with a side wheel such as 25 to provide the maximum overlapping engagement with the stub axle A. The inner portion 41 of each flat spring B is preferably bent upwardly and carried by a bracket C.

Each bracket C is preferably formed of one piece of rigid material such as bar metal, and includes an inner portion 50 which is partially coextensive with the inner portion 41 of a flat spring B. Inner portion 50 of a bracket C is flatwise against and fixed to the inner portion 41 of flat spring B by means of one or more bolts such as 45 or any suitable means. The inner portion 50 of bracket C includes one or more axle holes, or vertically extending axle slots 51 and 52 for accommodating one of opposite ends of the bicycle rear axle 22. The bracket C may thus be placed on the rear axle 22 and held against rotation by the axle nuts 23 and 24 and by additional means preferably in the form of a brace 54 to the rear stay 28 of the bicycle.

It will be apparent that, as thus far described, the invention includes a rigid bracket depending down from the rear axle of the bicycle, a stub axle extending inwardly from the auxiliary wheel and a single flat spring resiliently connecting the two together whereby the auxiliary wheel provides laterally spaced resilient support to the bicycle rear axle for assisting a rider to stay upright but not preventing excessive leaning. It is preferred that the coextensive portions of axle A and spring B extend horizontally and that the coextensive portions of spring B and bracket C extend vertically at substantially right angles thereto. While the entire spring could be straight and horizontal by fixing it to the bracket outwardly of an upward bend therein, the radius of the angular flexing of the spring would thus be shortened disadvantageously.

Stop means D for limiting the upward travel of each flat spring B is preferably provided. It comprises a rigid integral outer portion 60 on each rigid bracket C, the portion 60 extending laterally toward an auxiliary wheel 25 at a gradually increasing height above the plane of stub axle A. As shown, the portion 60 thus extends from the junction of spring B with bracket C at an angle of elevation above the axle and spring sufficient to enable spring B to flex upwardly through a predetermined angle and then to be stopped from further flexing. By this arrangement a rider is permitted to learn to balance himself, springs B continually urging the bicycle into an upright position but yielding slightly in either direction transversely to give the rider practice in regaining his balance. If the bicycle, however, leans too far to one side, the portion 60 stops further leaning and prevents a fall on the part of the rider. The rigid portion 60 of each bracket C serves an additional purpose in forming a foot rest upon which a second rider may stand. Because the portion 60 is above the axle and spring, the latter can continue to function even when a rider is standing on the portions 60.

Limit means E for limiting the travel of each flat spring B in all directions is preferably also provided. It comprises a substantially U-shaped rigid integral element 70 depending downwardly from the outer portion 60 of bracket C preferably proximate the middle of stub axle A. Element 70 includes a pair of legs 71 and 72 spaced apart a distance equal to the diameter of a stub axle A or the width of a flat spring B whereby either the spring or the stub axle slidably engage the inner faces of the legs. Legs 71 and 72 thus prevent travel of spring B in a horizontal plane either forward or backward relative to bracket C. However the vertical slot 75 formed thereby permits upward and downward travel of the spring and axle in a vertical plane with portion 60 forming the upper limit and the bight 73 forming the lower limit.

Figure 2:
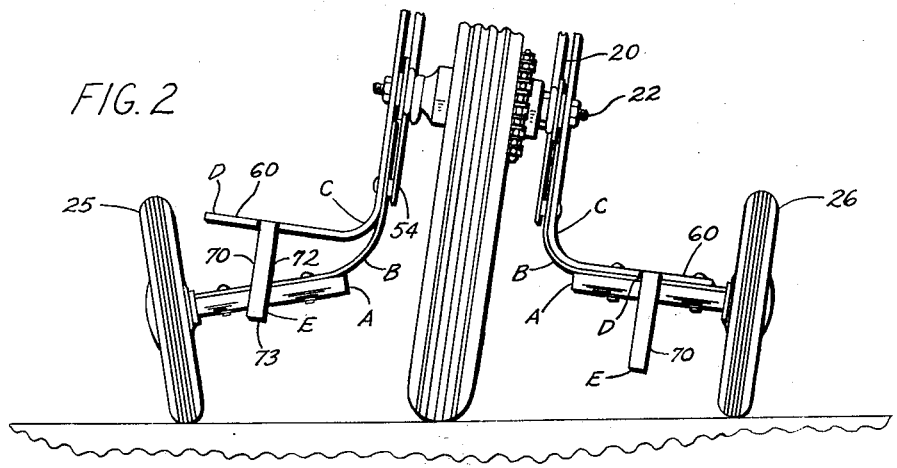
Fig. 2 is a view similar to Fig. 1 showing the action of the invention when a bicycle tilts or leans to one side.
Figure 3:
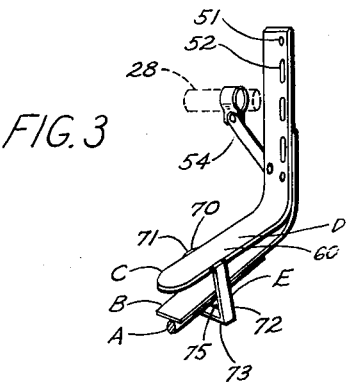
Fig. 3 is an enlarged perspective view illustrating a stabilizing attachment as shown in Figs. 1 and 2 with the wheel 25 broken away.
Figure 4:
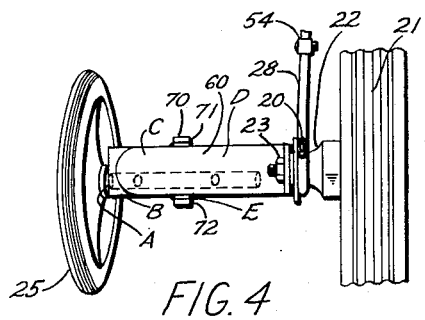
Fig. 4 is a fragmentary plane view of the stabilizing attachments shown in Fig. 1.

As shown in Fig. 2 the stabilizing attachment of this invention in its preferred form, enables a bicycle to lean sidewise without either wheel being lifted from the ground within angular limits determined by the portions 60 and 70 of the bracket C. At no time are the side wheels out of contact with the ground because the portion 60 stops leaning on one side before the bight 73 of the portion 70 on the other side could lift the adjacent wheel off the ground.

It would be possible to substitute a rigid centrally disposed rod for the U-shaped element 70, which rod passed through registering holes in spring B and axle A and terminated in a head. The rod would thus prevent horizontal movement and the head on the rod would form a lower limit. However, such a rod would be considerably weaker than a pair of legs such as 71 and 72 and the holes through the spring and axle would weaken those members.

The stabilizing attachment shown in the drawing represents the preferred embodiment of the invention but it is not intended to limit the same thereto and changes may be made in the form of mechanical equivalents without departing from the scope of the claims.

1. A stabilizing attachment for bicycles, said attachment comprising an auxiliary side wheel; a stub axle having said auxiliary side wheel mounted proximate the outer end thereof; a single flat spring having an outer portion partially coextensive with said stub axle and having said coextensive portion flatwise against and fixed to said axle for supporting the same; a rigid, one piece bracket having a portion partially coextensive with the inner portion of said flat spring and having said coextensive portion flatwise against and fixed to said flat spring for supporting the same, said bracket having an inner portion adapted to be secured on the rear axle of a bicycle by an axle nut, the coextensive portions of said flat spring and bracket extending substantially at right angles to the coextensive portions of said flat spring and axle and said bracket, spring and axle being adapted to space said auxiliary side wheel laterally from a bicycle while resiliently connecting said auxilary wheel and bicycle together.

2. An attachment as specified in claim 1 wherein said rigid bracket includes an integral outer portion extending laterally toward said auxiliary wheel at a gradually increasing height above the plane of said stub axle, said bracket outer portion forming a foot rest and forming upward stop means limiting the upward flexing of said axle and spring relative to said bracket.

3. An attachment as specified in claim 1 wherein said rigid bracket includes an integral rigid outer portion extending laterally toward said auxiliary wheel at a uniform angle of elevation and having rigid integral limit means depending downwardly therefrom for limiting the horizontal and vertical travel of said axle and flat spring relative to said bracket.

4. An attachment as specified in claim 3 wherein said rigid integral limit means comprises a substantially U-shaped element positioned intermediate of the length of said stub axle, said element including spaced apart, parallel, upstanding legs having opposed inside faces slideably engaging each opposite side edge of said leaf spring to prevent horizontal travel thereof.

5. A stabilizing attachment for bicycles comprising a pair of rigid, one piece brackets, each having a slot for affixing the same on an opposite side of a bicycle rear wheel axle; a pair of auxiliary side wheels each having a stub axle extending along the axis of rotation thereof; single spring means connecting each bracket to, and in direct supporting engagement with, one of said stub axles for holding said auxiliary wheels in contact with the ground during tilting of a bicycle and resiliently supporting a bicycle on both sides during such tilting, and rigid stop means integral with said brackets and spaced above the stub axles of said auxiliary wheels for forming an upward limit to the flexing of said spring means.

6. A stabilizing attachment as specified in claim 5 plus rigid limit means, integral with said rigid stop means and positioned adjacent the intermediate portion of said stub axles for limiting the travel of the outer ends of said stub axles in both horizontal and vertical planes relative to said brackets.

7. A stabilizing attachment for bicycles, said attachment comprising an auxiliary side wheel; a stub axle having said auxiliary side wheel mounted at the outer end thereof; a rigid bracket having an inner portion extending substantially parallel to the plane of said auxiliary wheel with an opening therethrough for an end of the rear axle of a bicycle; a single flat spring overlying and fixed to the inner end portion of said axle along the outer end portion of said spring and having the inner end portion of said spring fixed to and supported by said inner portion of the bracket; the outer portion of the bracket extending laterally toward said wheel above and at a slight angle of elevation to said spring and axle and having an integral U-shaped element depending downwardly intermediate thereof with a vertical slot therethrough fitting around said stub axle and spring and preventing forward and rear movement thereof while permitting limited travel in a vertical plane.

References Cited in the file of this patent

UNITED STATES PATENTS

| 2,391,982 | Kutil | Jan. 1, 1946 |
| 2,450,979 | Moller | Oct. 12, 1948 |

FOREIGN PATENTS

| 687,358 | France | Apr. 28, 1930 |
| 2,432 | Great Britain | of 1896 |